United States Patent [19]

Winnek

[11] Patent Number: 4,557,590
[45] Date of Patent: Dec. 10, 1985

[54] METHOD AND APPARATUS FOR MAKING TRUE THREE-DIMENSIONAL PHOTOGRAPHS FROM PSEUDO THREE-DIMENSIONAL PHOTOGRAPHS

[76] Inventor: Douglas F. Winnek, 80 Laurel Dr., Carmel Valley, Calif. 93924

[21] Appl. No.: 416,777

[22] Filed: Sep. 10, 1982

[51] Int. Cl.$^4$ .................. G03B 27/32; G03B 35/14
[52] U.S. Cl. ...................................... 355/22; 355/77
[58] Field of Search .............. 355/22, 32, 86, 95, 355/102, 77; 352/58

[56] References Cited

U.S. PATENT DOCUMENTS 3,528,736 9/1970 Jones ..................................... 355/22

Primary Examiner—Russell E. Adams
Assistant Examiner—Brian W. Brown
Attorney, Agent, or Firm—Townsend and Townsend

[57] ABSTRACT

A method and apparatus for exposing a photographic film with a true three-dimensional image when the image emanates from a photographic film having a pseudo three-dimensional image. A lenticular member having lenticulations on one surface is adapted to be mounted adjacent to a frame containing a film having a pseudoscopic or pseudo three-dimensional image thereon. The frame for the first film is spaced between the flat rear face of the lenticular member and a grating mask having a plurality of uniformly spaced slits therethrough which pass light. A second frame for a second photographic film is mounted on the opposite side of the grating mask. The frames have drive motors coupled thereto and control means causes the drive motors to operate simultaneously to move the frames at the same speed in opposite directions as light enters the lenticular screen and passes through the first film and the grating mask and onto the emulsion of the second film. A Fresnel lens is placed between a light source and the lenticulated surface of the lenticular member to render the light rays from the source generally parallel as they travel toward and enter the lenticular member.

12 Claims, 6 Drawing Figures

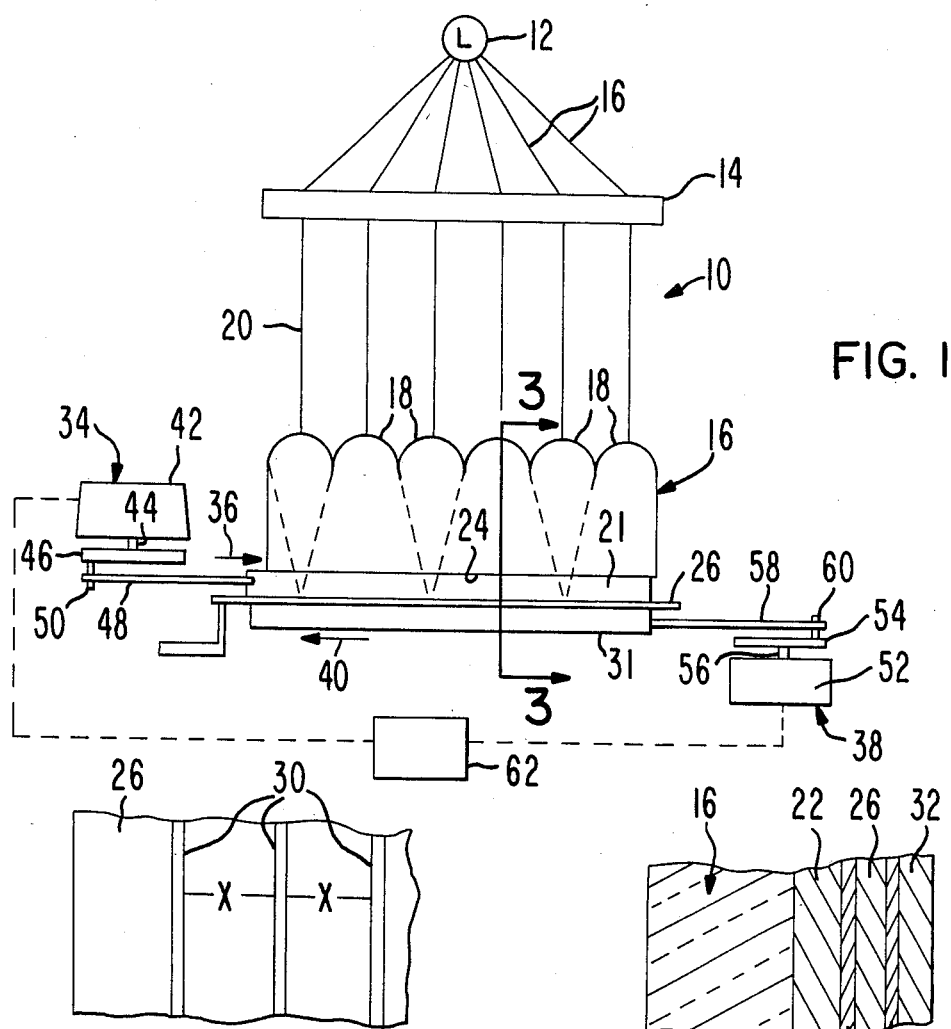
FIG. 1
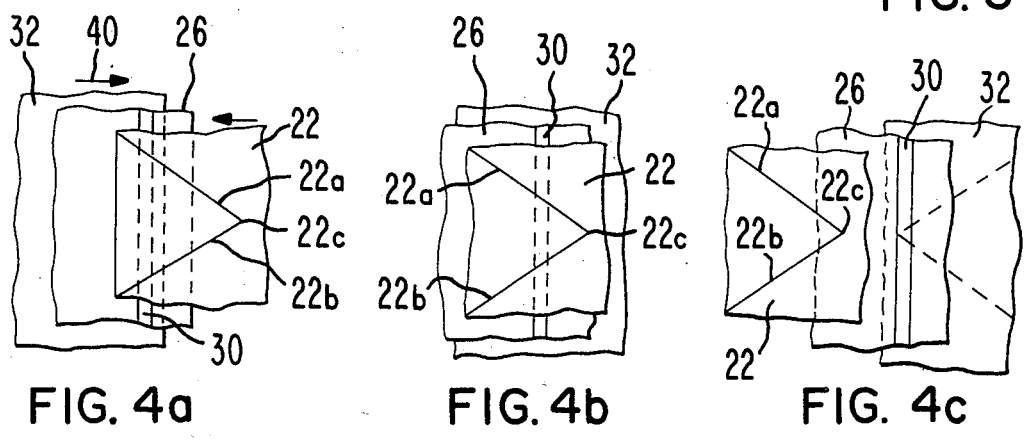
FIG. 2
FIG. 3
FIG. 4a
FIG. 4b
FIG. 4c

METHOD AND APPARATUS FOR MAKING TRUE THREE-DIMENSIONAL PHOTOGRAPHS FROM PSEUDO THREE-DIMENSIONAL PHOTOGRAPHS

This invention relates to improvements in making of three-dimensional photographs and, more particularly, to the making of a true stereoscopic photograph from a pseudo three-dimensional photograph.

BACKGROUND OF THE INVENTION

In making three-dimensional photographs using lenticular screens, one type of camera has been designed for this purpose. However, the camera does not operate to provide a stereoscopic, i.e., true three-dimensional, image bearing film. Instead, a pseudoscopic, i.e., pseudo three-dimensional, photograph is formed. A pseudoscopic image bearing film has an image reversed from that of a stereoscopic image bearing film. Thus, a pseudoscopic photograph, for instance, has image portions which appear when viewed to extend rearwardly of the plane of the film; whereas, in a stereoscopic image bearing film, the same image appears to project forwardly from the plane of the film. Pseudoscopic image bearing films cannot be used in quality photography and must be corrected, i.e. reversed, to be acceptable to meet even the minimum photographic standards.

Because of the need to convert pseudo three-dimensional image bearing films into true three-dimensional photographic films, a need exists for a simple apparatus and method for accomplishing this purpose to minimize production costs and to permit stereoscopic image bearing films to be made in a minimum of time and with a minimum of expenditure of effort.

SUMMARY OF THE INVENTION

The present invention satisfies the aforesaid need by providing an improved method and apparatus for making a contact print defining a stereoscopic or a true three-dimensional image bearing film, the contact print being made from a pseudoscopic or pseudo three-dimensional image bearing film made in any suitable manner, such as by a three-dimensional camera. To this end, the apparatus of the present invention comprises a pair of frames for mounting the developed pseudoscopic and the image bearling film/unexposed photographic film which will become a stereoscopic imaging bearing film. One frame is on one side of a grating mask and the other frame being on the opposite side of the grating mask. A plurality of light transmitting slits are provided in the mask, and a lenticular member is in front of the one frame to receive light from a light source. The light rays pass into and through the lenticular member and into and through the pseudoscopic film and the grating mask into the photographic film of the second frame. When the light passes through the slits, the two frames are moved simultaneously and at the same speed in opposite directions by power devices coupled to frames. The frames move a distance equal to one pitch line i.e., the distance between a pair of adjacent slits of the mask. When this occurs, the light passing through the slits exposes the film in the other frames and provides an image thereon which is a reversal of the image on the pseudoscopic film. When film of the other frame is exposed, it provides a stereoscopic or true three-dimensional image bearing film.

The primary object of the present invention is to provide an improved method and apparatus for forming a stereoscopic true three-dimensional image bearing film from a pseudoscopic or pseudo three-dimensional image bearing film by a contact printing with a lenticular member so that the stereoscopic image bearing film can be made quickly and easily and at minimum expense and without special skills on the part of the user.

Other objects of this invention will become apparent as the following specification progresses, reference being had to the accompanying drawings for an illustration of the invention.

IN THE DRAWINGS:

FIG. 1 is a schematic view of the apparatus of the present invention;

FIG. 2 is a rear elevational view of a portion of the grating mask forming a part of the apparatus of FIG. 1;

FIG. 3 is a cross-sectional view taken along line 3—3 of FIG. 1;

FIGS. 4a, 4b and 4c are fragmentary, sequential views showing the way in which two films move in respective frames of the apparatus relative to the grating mask of FIG. 2 in the operation of the apparatus.

The apparatus of the present invention is broadly denoted by the numeral 10 and includes a light source 12 and a rotating Fresnel lens 14 spaced from light source 12. Lens 14 is between light source 12 and a lenticular member 16 having lenticular ridges 18 serving as lenses to focus the parallel light beams 20 emanating from lens 14. The lens 14 serve to render light beam 16 parallel to form beams 20.

A first photographic film 22 which is a pseudoscopic image bearing film is mounted in frame 21 adjacent to the rear, flat face 24 of lenticular member 16. Film 22 will have been formed by operating a camera for making three-dimensional image bearing film. The image bearing films resulting from operation of the camera must be reversed to provide a stereoscopic image bearing film. The purpose in the practice of the present invention is to reverse the image of the pseudo three-dimensional image bearing film and to expose another photographic film with the reversed image so that a new image bearing film results, the new photograph being a stereoscopic image bearing film.

A grating mask 26 is fixed to a support 28 and is adapted to engage the emulsion layer 23 of film 22. Mask 26 is provided with a plurality of uniformly spaced, slots 30 shown in FIG. 2, the distance between a pair of slots being denoted by x.

A second photographic film 32 is mounted in a frame 31 at the rear face of mask 26 and has an emulsion 33 in engagement with the mask. Light can travel through film 22, through slots 30 and onto the emulsion of film 32 to expose the emulsion.

Frame 21 has a first power device 34 for moving film 22 one pitch line in the direction of arrow 36 (FIG. 1). Similarly, frame 31 has a power device 38 for moving film 32 in the direction of arrow 40 through a distance of one pitch line during the movement of film 22 in the direction of arrow 36. One pitch line is defined as the spacing x, this spacing also being the center-to-center distance between adjacent pairs of ridges 18 of lenticular member 16.

For purposes of illustration, power device 34 comprises a motor 42 having a drive shaft 44 provided with a rotor 46 thereon. A link 48 is pivotally coupled at one end thereof to a pin 40 on the outer periphery of rotor 46. The other end of link 48 being pivotally coupled in any suitable manner to frame 21. Upon actuation of motor 42, rotor 46 rotates about the axis of drive shaft 44, moving frame 21 and film 22 a distance equal to one pitch line in the direction of arrow 36 relative to mask 26.

Power device 38 includes a motor 52 having a rotor 54 mounted on drive shaft 56 thereof. A link 58 is pivotally secured at one end thereof to a pin 60 on the outer periphery of rotor 54 and is pivotally coupled at the other end thereof in any suitable manner to frame 31. Thus, when motor 52 is actuated, film 32 is moved in the direction of arrow 40 (FIG. 1) relative to mask 26.

Control means 62 is provided to actuate motors 42 and 52 simultaneously. In this way, during use of the apparatus 10, films 22 and 32 are shifted in opposite directions simultaneously at the same speed and through the same distance relative to mask 26 which remains stationary by virtue of its connection to the rigid, fixed support 28. In practice, film 32 can be housed in any suitable manner such that it is not exposed to ambient light but receives light only through slits 30 of mask 26. To this end, film 32 can be housed in a suitable cassette.

FIGS. 4a, 4b, and 4c show the sequence in which a photographic image is transferred from film 22 to film 32. In FIG. 4a, film 22 has an image defined by a pair of lines 22a and 22b which diverge to a point 22c. When light shines through the image on film 22, the light passes through slit 30 in mask 26 and exposes the photographic emulsion on film 32 immediately to the rear of mask 26. FIG. 4a shows the positions of films 22 and 32 as they commence their movements in the directions of arrows 36 and 40, respectively. FIG. 4b shows the positions of the films intermediate their paths of travel; and FIG. 4c shows the final positions of the films with reference to mask 26. FIG. 4c further shows the transferred image on film 32 in dashed lines. It is clear from FIG. 4c that the image initially on film 22 not only has been transferred from film 22 to film 32 but that the image on film 32 has been reversed from the image on film 22.

The present invention provides a simple method and apparatus for not only transferring an image from a pseudoscopic image bearing film but also reversing the image so that when a photographic emulsion is exposed with the reversed image, another image bearing film is formed which is a steroscopic photograph. When the stereoscopic image bearing film is viewed through a lenticular screen, such as lenticular member 40, stereoscopic or true three-dimensional effects will be discerned by viewing directly into the lenticular sheet to film 32 at the rear, flat surface of the lenticular sheet. By moving the head back and forth, the observer will perceive a three-dimensional effect which is a different three-dimensional effect from that perceived when viewing film 22.

What is claimed is:

1. Apparatus for transferring a reversed image from a pseudoscopic image bearing film to an unexposed photographic film as a true stereoscopic image comprising: a lenticular member having a pair of opposed surfaces, one of the surfaces having a plurality of lenticulations thereon; a grating mask near the other surface of the lenticular member, said grating mask having a plurality of uniformly spaced slits transparent to light, the remainder of the mask being opaque to light; means on one side of the grating mask for shiftably mounting a first photographic film for movement relative to the mask in the space between the lenticular member and the grating mask, said first film having an image thereon to be transferred and to be reversed; means adjacent to the opposite side of the mask for shiftably mounting a second photographic film for movement relative to the mask; and second means coupled with the mounting means for the second film for moving the second film in a direction opposite to said one direction, whereby light from a source passing through the lenticular member and the first film will expose the emulsion of the second film and provide an image on the second film which is a reversal of the image on the first film.

2. Apparatus as set forth in claim 1, wherein is included control means coupled with the first means and the second means for actuating the first means and the second means simultaneously.

3. Apparatus as set forth in claim 1, wherein the mounting means for the first film and the mounting means for the second film move at least a distance equal to the distance between a pair of adjacent slits in said mask.

4. Apparatus as set forth in claim 1, wherein is included a light source spaced from the lenticulated surface of the lenticular member, and a lens between the light source and the lenticular member for rendering the light beams from the light source generally parallel with each other.

5. Apparatus as set forth in claim 4, wherein said lens is a Fresnel lens.

6. Apparatus as set forth in claim 1, wherein said first means comprises a first motor and a link pivotally connecting the motor to the mounting means for the first film, the second means comprising a second motor, and a second link pivotally coupling the motor with the mounting means for the second film.

7. Apparatus as set forth in claim 1, wherein each of said first means and said second means comprises a frame.

8. A method of transferring a pseudo three-dimensional image from a first film onto a second film as a true three-dimensional image comprising: placing the first film and the second film on opposite sides of a region having a number of uniformly spaced, elongated, parallel light transmitting passages therethrough; directing light beams through a series of elongated lenticulations parallel to said passages and then through the first film and the passages and onto the second film to expose the second film with an image of the first film; and moving the films in opposite directions as the light passes through the passages.

9. A method as set forth in claim 8, wherein the films are moved a distance equal to the distance between a pair of adjacent passages.

10. A method as set forth in claim 8, wherein is included the step of rendering the light beams generally parallel before the light beams pass into and through the lenticular screen.

11. A method as set forth in claim 8, wherein the films are moved along linear paths.

12. A method as set forth in claim 8, wherein said films are simultaneously moved at the same speed and through the same distance.

* * * * *